May 12, 1936.   A. JOHNSON ET AL   2,040,177

HYDRAULIC LUBRICATING CONNECTION

Filed Oct. 30, 1930

Inventor
August Johnson
John S. Johnson
By Howard Fischer
Attorney

Patented May 12, 1936

2,040,177

UNITED STATES PATENT OFFICE 2,040,177

HYDRAULIC LUBRICATING CONNECTION

August Johnson and John S. Johnson, Fargo, N. Dak., assignors to Jiffy Lubricator Company, Inc., Fargo, N. Dak., a corporation of North Dakota Application October 30, 1930, Serial No. 492,173

9 Claims. (Cl. 285—170)

This invention relates to a hydraulic connection for greasing the joints of motor vehicles and the like, where it is desired to provide a connector on the end of the lubricating tube or hose which will connect with the lubricating connection either on a shackle bolt or the joint to be lubricated.

It has been common practice to use certain types of connections on joints, bearings, shackles, and in fact any joint, shaft, or bearing which is to be lubricated, to provide a connector in which a valve is formed operated automatically to close the connector when the grease gun coupling has been disengaged therefrom. This practice has been carried out in various forms. There are certain advantages in connectors that have been made heretofore as well as other disadvantages. Some of the disadvantages in connectors which have been used are in the necessity of adjusting the coupling from the lubricating grease gun or the like in a particular manner before the connection can be made. Others reside in making it necessary to hold the lubricating medium, gun or connection with force or pressure up against the connection through which the lubrication is to be passed.

We have accomplished a simple effective hydraulic connector which may be used upon any grease gun, hose or lubricating connection and it requires no particular position or setting before it is ready for operation. Our hydraulic connector is of a simple nature having a compact structure and it may be attached quickly by simply slipping it over the end of the valve connector on the shackle, bearing or joint to be lubricated. When the pressure of the grease or lubricant is directed through our hydraulic connection it automatically fastens or clutches itself on to the connection through which the lubricant is introduced and as long as the lubricant is passing through the same or is forced into our hydraulic connection, it will be clutched tightly to the connector so as to form a tight joint between the greast gun and the joint or bearing to be greased.

With this hydraulic connection, joints may be quickly lubricated and in cases like the shackle bolts of an automobile, it is not necessary for the operator to place our hydraulic connector in a certain position and then move the same to lock it but it only requires being slipped over the end of the connection or valve on the shackle and it is ready to operate. In greasing the joints of an automobile, we have found the same to be very desirable. Its simplicity and quick operation we believe make it highly desirable for lubrication under high pressure for bearings and joints of any nature.

The features, details and primary objects will be set forth to clearly define the advantages of our hydraulic connection.

In the drawing forming a part of this specification:

Figure 1:
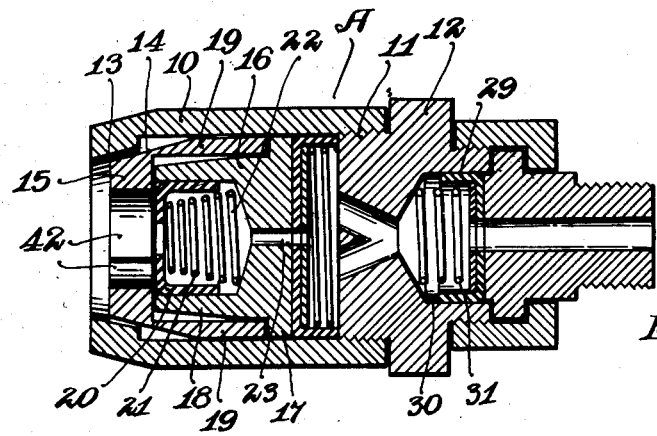
Figure 1 is a longitudinal side section through our hydraulic connection.
Figure 2:
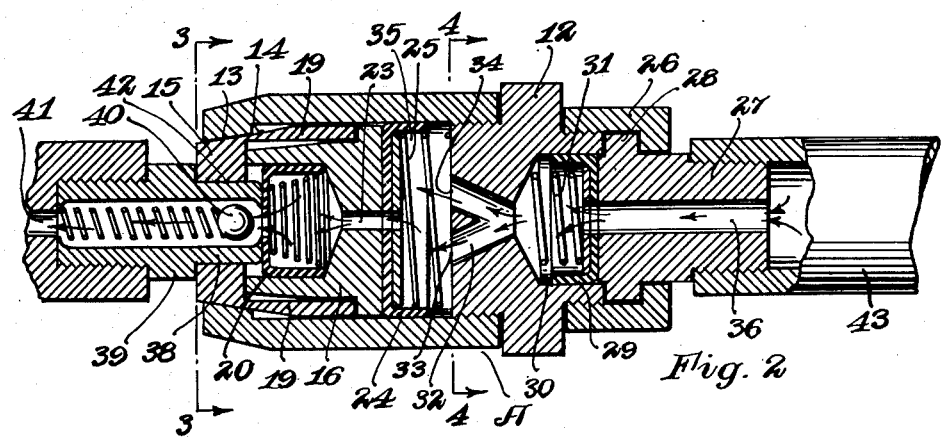
Figure 2 is a longitudinal section through our hydraulic connection showing it connected to a valve connector either for a shackle or any other joint or bearing.
Figure 3:
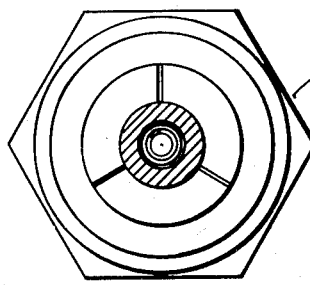
Figure 3 is a section on the line 3—3 of Figure 2.
Figure 4:
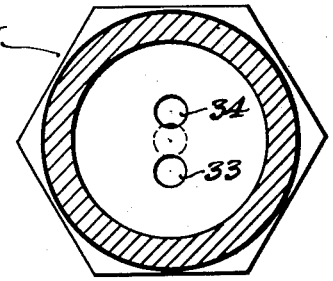
Figure 4 is a section on the line 4—4 of Figure 2.

This hydraulic connector A is formed with a nozzle sleeve 10 on the outer end which is threaded at 11 to the intermediate body portion 12.

The nozzle sleeve 10 is formed with an inner conical surface 13 against which the beveled outer surface 14 of the clutch jaws 15 are adapted to engage as will be hereinafter described.

Within the sleeve 10, we provide the valve member 16 which is formed with an annular flange 17 on the rear portion thereof and the forward portion 18 of which is tapered off to fit within the inner flange portions 19 of the gripping jaws 15. The valve member 16 is provided with a leather valve member 20 back of which a coil spring 21 is positioned within the recess 22. A grease passageway 23 is formed axially through the valve member 16.

Back of the valve member 16, we provide a leather piston 24 which is urged toward the valve member 16 by the coil spring 25. The piston 24 is positioned between the valve member 16 and the intermediate body portion 12 of the hydraulic connector A.

The body portion 12 is connected by the collar 26 to the coupling member 27 which is formed with an annular shoulder 28 so as to provide a swivel connection for the connector 27 with the body 12. A leather packing 29 is positioned within the recess or chamber 30 formed in the rear portion of the body 12 and is urged by a coil spring 31 into operative position. Leading from the chamber 30, we provide a double grease or lubricant outlet passageway 32 which has the openings 33 and 34 which direct lubricant or grease into the chamber 35 in which the piston 24 is operated.

An axial opening 36 is formed through the connector 27 leading into the chamber 30. This provides a passageway for introducing a lubricant into the chamber 30 from which it is directed toward the sides of the chamber 35 as it passes out of the openings 33 and 34. Thus, as the grease or lubricant is introduced into the chamber 35 towards the outer portions thereof, the piston 24 will quickly operate the valve member 16 which engages against the inner flange portions 19 of the jaws 15 and forces them against the conical restriction 13 in the nozzle 10. This action of the grease of lubricant in the hydraulic lubricating connection A causes the clutching jaws 15 to grab against the end 38 of the connector 39 so as to fasten the hydraulic connector A firmly to the connector 39. A leather valve member 20 will be simultaneously with the operation just described pressed against the outer end of the portion 38 of the connector 39 to provide a packing joint therebetween and as the grease fills the chamber 35, it will pass on through the opening 23 in the valve member 16 and operate the ball check 40 in the connection 39 to introduce lubricant to the passageway 41.

This hydraulic connector A accomplishes a very desirable result in its simple operation. It quickly fastens itself tightly to the connector such as 39 and it is not necessary to have any grooves, pins, or other connecting means, owing to the automatic operation of the hydraulic connector A. The connector A is easy to slip on to a connector such as 39, and it is also easy to remove the same. The gripping jaws 15 have inner gripping surfaces 42 which engage a broad surface of the connection such as 39 and thus firmly and rigidly attach the connector A during operation to transmit grease from the hose or connecting tube 43 leading from the grease gun. The more pressure or force that is exerted by the grease or the higher the pressure of the same from the grease gun, the more quickly and efficiently the automatic hydraulic connector A will operate. Thus, we accomplish a very desirable result.

In accordance with the patent statutes, we have described our automatic hydraulic grease connector for grease guns and couplings to engage the valve connectors or other similar connectors with shackle bolts, shafts, bearings, or joints, and while the structure illustrated is of a peculiar formation, we desire to have it understood that the same is only suggestive of carrying out the principles of our invention and we wish the same to be understood within the following claims:

We claim:

1. A connector for pressure lubricators comprising a casing having a cylindrical bore terminating at one end in a tapered bore, closure means on the other end having a passage therethrough communicating with the interior of said casing, said passage providing an inlet for lubricant into said cylindrical bore, a hollow piston member slidably received in said casing and adapted to be projected forwardly by the lubricant in said cylindrical bore under pressure developed in said lubricator during its operation and conveyed into said cylindrical bore through said inlet, rigid clamping members on said piston and slidable therewith having portions slidably engaging the tapered portion of said casing for securely clamping a fitting, and sealing means in said hollow piston against which the fitting is adapted to press when held by said clamping members.

2. A connector for pressure lubricators comprising a casing having a cylindrical bore terminating at one end of the casing in a tapered bore, a closure for the other end of said casing having a passage communicating with the bore of said casing to convey lubricant thereinto, a hollow piston member in said bore in said casing and movable by the pressure of lubricant in said bore developed in said lubricator during the operation thereof, rigid clamping members having portions arranged between said piston member and the casing, inwardly projecting clamping portions on said members, said members having surfaces slidably engaging the tapered wall of the casing whereby said clamping portions are moved radially inward when the piston member is moved toward the tapered end of said casing for clamping the end of a fitting when inserted in the end of said casing, and a sealing means in said hollow member against which the end of the fitting is adapted to press, said means comprising a flexible washer secured in said hollow piston adapted to be pressed against said fitting by the pressure of the lubricant being dispensed.

3. A connector for a pressure lubricator comprising, a casing having a cylindrical bore terminating at one end in a tapered bore, closure means on the other end having a passage therethrough communicating with the interior of said casing, said passage providing an inlet for lubricant into said cylindrical bore, a hollow piston member slidably received in said casing and adapted to be projected forwardly by the lubricant in said cylindrical bore under pressure developed in said lubricator during its operation and conveyed into said cylindrical bore through said inlet, rigid clamping members on said piston and slidable therewith having portions slidably engaging the tapered portion of said casing for securely clamping a fitting, and a sealing end in said hollow piston against which the fitting is adapted to press when held by said clamping members.

4. A connector for pressure lubricators comprising, a conduit adapted for connection with a source of lubricant supply, a casing fixed against longitudinal movement relative to said conduit and terminating at its end in an annular internal camming surface, a member co-axially mounted with respect to said casing, rigid clamping jaws mounted in secure but unfastened relationship between said member and said casing for radial swinging movements within said casing and having a portion adapted to engage said camming surface, said jaws being adapted to be moved longitudinally relative to the axis of said casing and relative to said conduit to engage said portion with said camming surface for forcing said jaws to swing about a pivot point to bring their outer ends radially toward and into clamping engagement with a fitting by the lubricant pressure from the source of supply, and sealing means in the end of said member against which the fitting is adapted to press when held by said clamping jaws.

5. A lubricant discharge nozzle and coupler for servicing a lubricant receiving fitting comprising, a conduit adapted for connection with a source of lubricant supply, a casing fixed against longitudinal movement relative to said conduit, internal cam guide surfaces formed on the inner wall of said casing at one end thereof, a plurality of rigid and inflexible clamp jaws mounted in unfastened but confined relationship within said casing for swinging movements within said casing whereby their outer ends may be moved radially into and out of engagement with said fitting when the fitting is disposed within the jaws, said jaws being provided with cam surfaces engageable with said internal cam guide surfaces formed on the inner wall of said casing, and means operable by lubricant pressure for producing relative movements between said jaws collectively and said casing and said conduit, whereby the outer ends of the jaws may be forced radially toward and into clamping engagement with said fitting through the medium of said internal cam guide surfaces, whereby clampingly to engage said fitting.

6. A lubricant discharge nozzle and coupler for servicing a lubricant receiving fitting comprising a conduit adapted for connection with a source of lubricant supply, a casing fixed against longitudinal and transverse movement relative to said conduit, a plurality of rigid and inflexible clamping jaws arranged in unfastened but confined relationship annularly about the interior of said casing and mounted adjacent their inner ends within said casing for bodily swinging movements within said casing radially at their outer ends for engagement with a fitting, said clamping jaws and said casing having cooperative camming surfaces formed thereon, the casing having an internal camming annular surface and the clamping jaws each having an external camming surface, toward their outer ends, and means actuated by lubricant pressure for producing relative longitudinal movement between said jaws collectively and said casing and said conduit, whereby the jaws may be forced radially toward and into clamping engagement with said fitting through the medium of said camming surfaces whereby clampingly to engage said fitting under lubricating pressure.

7. A coupler for pressure lubricators comprising a conduit adapted for connection with a source of lubricant supply, a casing fixed against longitudinal movement relative to said conduit and terminating at its outer end in an internal camming surface, a tubular member co-axially mounted with respect to said casing and within the confines of the casing, a plurality of rigid clamping jaws independently retained in annular array and at relatively fixed distances apart from one another between adjacent surfaces of said casing and said member, said jaws being in unfastened relationship with respect to said casing and capable of collective bodily shifting upon movement thereof relative to the camming surface of the casing under the pressure of lubricant passing through the coupler, thereby to cause the jaws to move into clamping engagement with a fitting with intensity in proportion to the pressure of the lubricant passing through the coupler to form a lubricant connection between said conduit and said inner member and the fitting.

8. A coupler for servicing pressure fed lubricant receiving fittings comprising, a conduit adapted for connection to a source of lubricant supply, a casing fixed against longitudinal movement relative to said conduit, a core having a passageway extending longitudinally therethrough located within said casing substantially along the longitudinal axis thereof and co-operating with the casing to provide a space therebetween adjacent to the outer end of the casing, a fitting engaging sealing surface on said core surrounding the discharge orifice of said passageway, and means operable, upon relative movement between said casing and said core, clampingly to engage a fitting when said fitting is in register with said orifice and fitting against said core, said clamping means including a plurality of rigid fitting engaging jaws located within said space between said casing and said core and freely engaging the outer wall of said core, an internal annular camming surface on the inner wall of said casing at one end thereof, and fitting engaging portions formed on the outer ends of said jaws, and means whereby the pressure of lubricant passing through the coupler will cause said jaws to engage the fitting and press said sealing surface against the fitting forming a lubricant tight connection.

9. A connector for pressure fed lubricant fittings comprising, a conduit adapted at one end for connection with a source of lubricant supply, a lubricant conducting member associated with the other end of said conduit, said conducting member having a lubricant passageway therethrough for the passage of lubricant from the conduit to a fitting, a casing member surrounding said conducting member and spaced from said conducting member at the outer end of said conducting member, said casing member being secured against longitudinal movements relative to said conduit member, a plurality of fitting engaging jaws disposed in annular and unfastened array in the space provided between said casing and conducting member, said jaws having interengaging means for retaining the jaws against displacement from said space, an internal cam surface formed inside said casing member, and a complemental cam surface formed on each of said jaws for engaging said internal cam surface in said casing member, and means whereby when lubricant pressure is introduced into said connector said jaws will be forced by the lubricant pressure into clamping engagement with a fitting by relative movements in one direction between said cam surfaces.

AUGUST JOHNSON.
JOHN S. JOHNSON.